United States Patent
Frank et al.

(10) Patent No.: US 11,606,010 B2
(45) Date of Patent: Mar. 14, 2023

(54) ELECTRIC MACHINE COMPRISING A DEVICE FOR MONITORING THE ROTOR WINDING HEAD

(71) Applicant: VOITH PATENT GMBH, Heidenheim (DE)

(72) Inventors: Achim Frank, Illerberg-Voehringen (DE); Babette Schwarz, Syrgenstein (DE)

(73) Assignee: Voith Patent GmbH, Heidenheim (DE)

( * ) Notice: Subject to any disclaimer, the term of this patent is extended or adjusted under 35 U.S.C. 154(b) by 88 days.

(21) Appl. No.: 17/279,195

(22) PCT Filed: Sep. 16, 2019

(86) PCT No.: PCT/EP2019/074629
§ 371 (c)(1),
(2) Date: Mar. 24, 2021

(87) PCT Pub. No.: WO2020/064386
PCT Pub. Date: Apr. 2, 2020

(65) Prior Publication Data
US 2022/0037968 A1    Feb. 3, 2022

(30) Foreign Application Priority Data

Sep. 27, 2018 (DE) ...................... 10 2018 123 845.2

(51) Int. Cl.
*H02K 11/35* (2016.01)

(52) U.S. Cl.
CPC .................................. *H02K 11/35* (2016.01)

(58) Field of Classification Search
CPC ......... H02K 11/35; H02K 11/20; H02K 15/16
See application file for complete search history.

(56) References Cited

U.S. PATENT DOCUMENTS

| 9,337,765 | B2 | 5/2016 | Strack |
| 2019/0020244 | A1 | 1/2019 | Frank et al. |

FOREIGN PATENT DOCUMENTS

| AT | 379864 B | 3/1986 | | |
| DE | 102009037990 A1 | * | 2/2011 | ............. H02K 11/20 |

(Continued)

OTHER PUBLICATIONS

JP2000346916A English translation (Year: 2022).*

(Continued)

*Primary Examiner* — Tulsidas C Patel
*Assistant Examiner* — Viswanathan Subramanian
(74) *Attorney, Agent, or Firm* — Laurence A. Greenberg; Werner H. Sterner; Ralph E. Locher

(57) ABSTRACT

An electric machine contains a rotor winding head and a device for monitoring same. The device contains a microwave radar system which has a transceiver unit, a sensor, and a cable. The sensor is lance-shaped, and the longitudinal axis of the sensor is arranged in the radial direction. The sensor extends between the stator winding elements, and the sensor contains a lance-shaped support, an antenna, and electric conductors. The support is made of non-magnetic and non-conductive materials, and the antenna is arranged on the sensitive end of the sensor and is connected to the support. The electric conductors connect the antenna to the cable and are connected to the support, and the sensor contains a voltage insulation which surrounds the support, the antenna, and the conductors.

11 Claims, 2 Drawing Sheets

(56) References Cited

FOREIGN PATENT DOCUMENTS

| DE | 102011105427 A1 | | 12/2012 |
|---|---|---|---|
| EP | 0608442 A1 | | 8/1994 |
| EP | 2221625 A1 | | 8/2010 |
| EP | 2672241 A2 | | 12/2013 |
| JP | H04313074 A | * | 11/1992 |
| JP | 2000346916 A | | 12/2000 |
| WO | 2013127554 A2 | | 9/2013 |
| WO | 2017157679 A1 | | 9/2017 |

OTHER PUBLICATIONS

WO2017157679A1 English translation (Year: 2022).*
JPH04313074A English translation (Year: 2022).*
DE102009037990A1 English translation (Year: 2022).*

* cited by examiner

ELECTRIC MACHINE COMPRISING A DEVICE FOR MONITORING THE ROTOR WINDING HEAD

BACKGROUND OF THE INVENTION

Field of the Invention

The present invention relates to an electric machine comprising a rotor winding head. Such machines are used, for example, in power plants such as pumped-storage power plants. Here, double-fed asynchronous machines in the power range from 20 MVA are used in variable-speed operation.

DE 10 2011 105 427 A1 discloses an electric machine that has a device suitable for monitoring the rotor winding head. For this purpose, a conductor for conducting energy is applied to the winding head. The device also comprises a detector for detecting the energy flow in the conductor. The known solution has the disadvantage that retrofitting such a device to an existing machine is not readily possible.

SUMMARY OF THE INVENTION

The object on which the present invention is based is to specify a device that can be easily integrated into an existing machine.

WO 2017/157679 A1 discloses a device for monitoring the air gap of an electric machine by use of a microwave radar system that can be easily integrated into an existing machine. However, WO 2017/157679 A1 does not provide any indications of how the disclosed technology may be used to monitor the rotor winding head.

The inventors have set themselves the object of modifying the technology disclosed in WO 2017/157679 A1 such that it can be used to monitor the rotor winding head.

According to the invention, this object is achieved by an electric machine having the features of the independent claim. Further advantageous developments are given by the dependent subclaims.

The solution according to the invention is explained below with reference to figures.

DETAILED DESCRIPTION OF THE INVENTION

Figure 1:
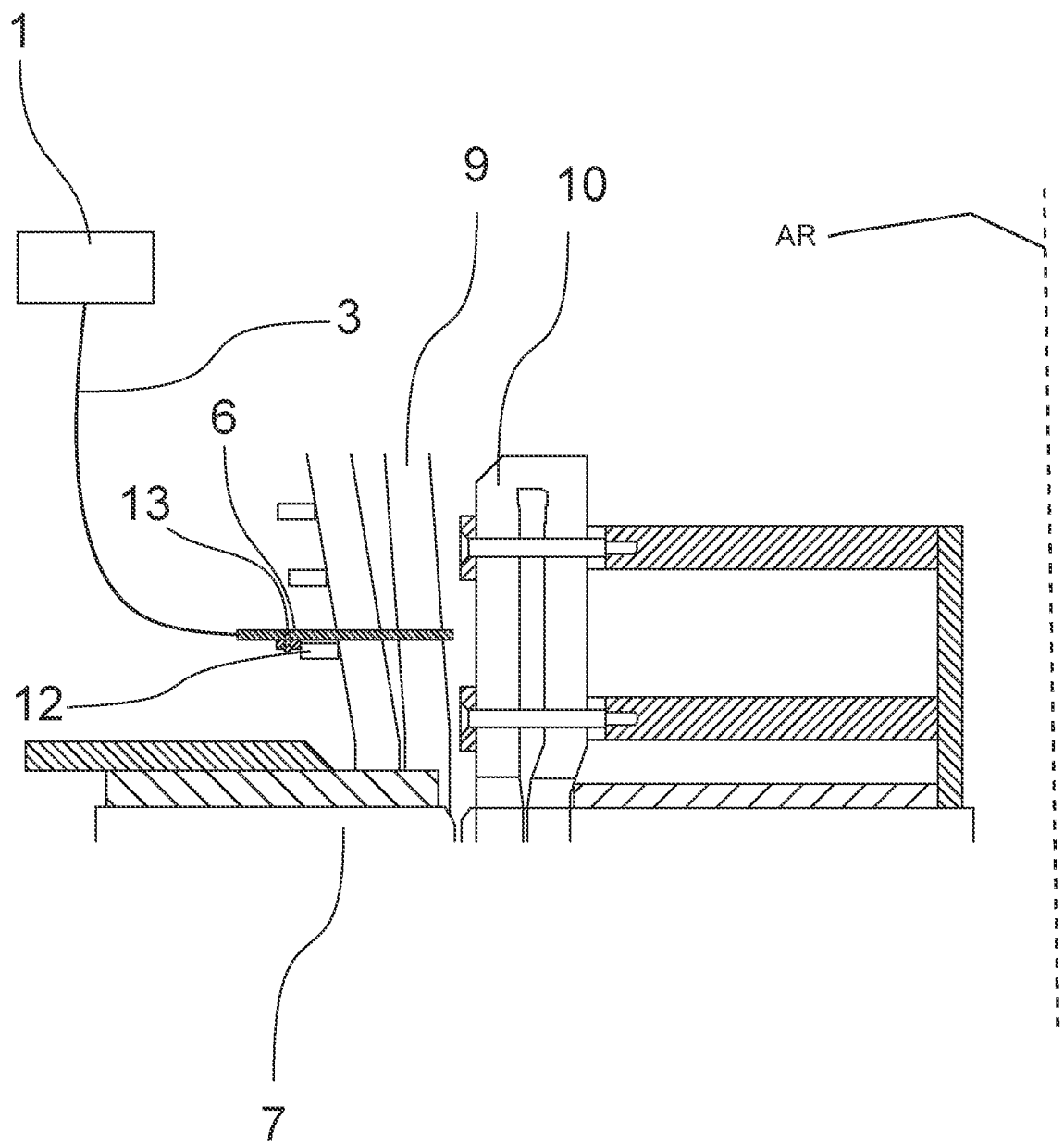
FIG. 1 Electric machine having a device according to the invention for monitoring the rotor winding head.

FIG. 1 shows a portion of an electric machine in a section parallel to the axis of rotation AR. The electric machine comprises a stator and a rotor. The stator comprises a laminated core, denoted by 7. The rotor comprises a laminated core, denoted by 8. The stator comprises winding elements that are located in grooves of the laminated core 7, and the ends of which extend in the axial direction beyond the laminated core 7 and thus form the stator winding head. One of these winding elements is denoted by 9. Similarly, the rotor comprises winding elements that are located in grooves of the laminated core 8, and the ends of which extend in the axial direction beyond the laminated core 8 and thus form the rotor winding head. One of these winding elements is denoted by 10. The electric machine further comprises a transmitting and receiving unit for the emission and receiving of microwaves, which is denoted by 1, and a lance-shaped probe, which is denoted by 6. The probe 6 is connected to the transmitting and receiving unit 1 by a cable, denoted by 3. The lance-shaped probe 6 is arranged on the stator winding head, the longitudinal axis of the probe 6 extending in the radial direction. In this case, the probe 6 is located between the stator winding elements 9, with the end of the probe 6 that is connected to the cable 3 facing radially outward. In the axial direction, the probe 6 is arranged such that the sensitive end of the probe 6 is opposite a part of a rotor winding element 10.

It is advantageous if the probe 6 can be attached to existing elements of the electric machine. Thus, in FIG. 1, the probe 6 is connected to a support ring 12 of the stator winding head. However, special holding devices 13 for the probe 6 may also be provided, in particular for newly manufactured electric machines.

Figure 2:
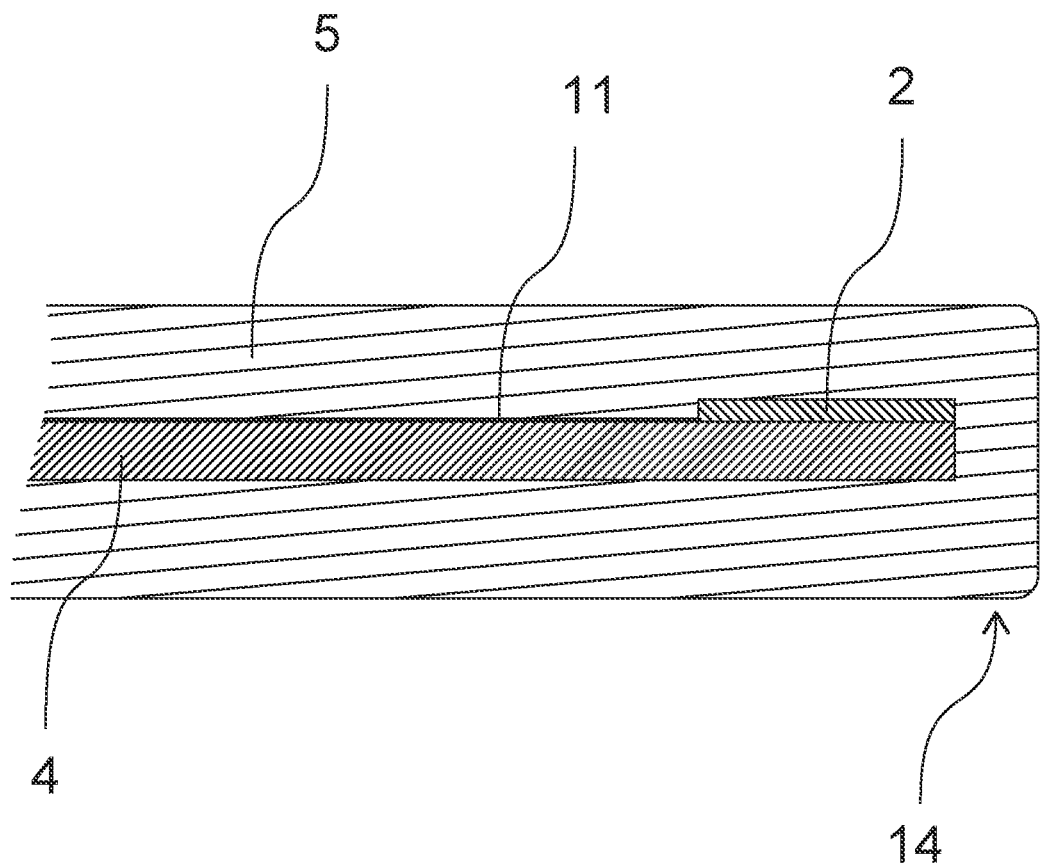
FIG. 2 Enlarged portion of the device according to the invention as per FIG. 1.

FIG. 2 shows an enlarged portion of the probe 6 from FIG. 1 with its sensitive end 14. The probe comprises a lance-shaped support, which is denoted by 4 and is made of non-magnetic and non-conductive materials. A very suitable material for the support 4 in this case is fiberglass. However, other materials such as, for example, glass-fiber reinforced plastic, laminated fabric or wood are also suitable. At the end of the support 4, which is located at the sensitive end of the probe 6, there is an antenna, which is denoted by 2 and which is connected to the support 4. The connection in this case may be effected by adhesive bonding. However, all other suitable methods of connection are also possible. For the purpose of connecting the antenna 2 to the cable 3, extending between the antenna 2 and the cable 3 there are electrical conductors, which are denoted by 11 and which are connected to the support 4. The support 4, the antenna 2 and the electrical conductors 11 are surrounded by a voltage insulation, which is denoted by 5. In principle, the connection of the antenna 2 and the conductors 11 to the support 4 may be effected solely by the voltage insulation 5. In order to simplify the production of the probe, however, it is advantageous for the said elements to be fastened to the support 4 independently of the voltage insulation 5. The conductors 11 may also consist, for example, of copper strips deposited on the support 4.

With the aid of the arrangement described, a deformation of the rotor winding head can be detected, which results in a change (usually a reduction) in the distance between the sensitive end of the probe and at least one rotor winding element.

The described device can be easily retrofitted in an existing electric machine, since for this purpose the lance-shaped probe can simply be pushed between the stator winding elements, in the region of the stator winding head, and fastened to existing elements of the stator. The stator winding head is easily accessible from the outside. The voltage insulation of the probe protects it from the voltage prevailing there during operation of the electric machine. The transmitting and receiving unit may be arranged on the outside of the stator or close to it. This also simplifies retrofitting.

The invention claimed is:

1. An electric machine, comprising:
   a stator having a stator laminated core with grooves formed therein, said stator containing winding elements that are disposed in said grooves of said stator laminated core and projecting axially therefrom and thus forming a stator winding head;

a rotor having a rotor laminated core with grooves formed therein, said rotor containing winding elements that are disposed in said grooves of said rotor laminated core and projecting axially therefrom and thus forming a rotor winding head; and a device for monitoring said rotor winding head, said device containing a microwave radar system having a transmitting and receiving unit for the emission and receiving of microwaves, a probe and a cable connecting said probe to said transmitting and receiving unit, said probe being lance-shaped, said probe having a longitudinal axis disposed in a radial direction and said probe is disposed on said stator winding head, wherein said probe extending between said stator winding elements, said probe having an end connected to said cable facing radially outward, said probe having a sensitive end and is disposed in an axial direction such that said sensitive end of said probe is disposed opposite a part of one of said winding elements of said rotor laminated core, said probe having a lance-shaped support, an antenna and electrical conductors, wherein said lance-shaped support being made of non-magnetic and non-conductive materials, and said antenna is disposed at said sensitive end of said probe and connected to said support, and said electrical conductors connect said antenna to said cable and are connected to said support, said probe having a voltage insulation surrounding said support, said antenna and said conductors, such that a deformation of said rotor winding head can be detected.

2. The electric machine according to claim 1, wherein said support is composed of fiberglass.

3. The electric machine according to claim 1, wherein said support is composed of glass-fiber reinforced plastic.

4. The electric machine according to claim 1, wherein said support is composed of laminated fabric.

5. The electric machine according to claim 1, wherein said support is composed of wood.

6. The electric machine according to claim 1, wherein said electrical conductors are composed of copper deposited on said support.

7. The electric machine according to claim 1, wherein said transmitting and receiving unit is disposed on an outside of said stator.

8. The electric machine according to claim 1, wherein said stator winding head has a support ring, said probe is connected to said support ring of said stator winding head.

9. The electric machine according to claim 1, further comprising a holder, said probe is connected to said holder.

10. The electric machine according to claim 1, wherein the electric machine is a doubly-fed asynchronous machine.

11. The electric machine according to claim 10, wherein the electric machine has at least a power of 20 MVA.

* * * * *